July 10, 1923.
R. ROBERTSON
1,461,546
APPARATUS FOR SPRAYING LIQUIDS BY COMPRESSED AIR
Original Filed June 17, 1920
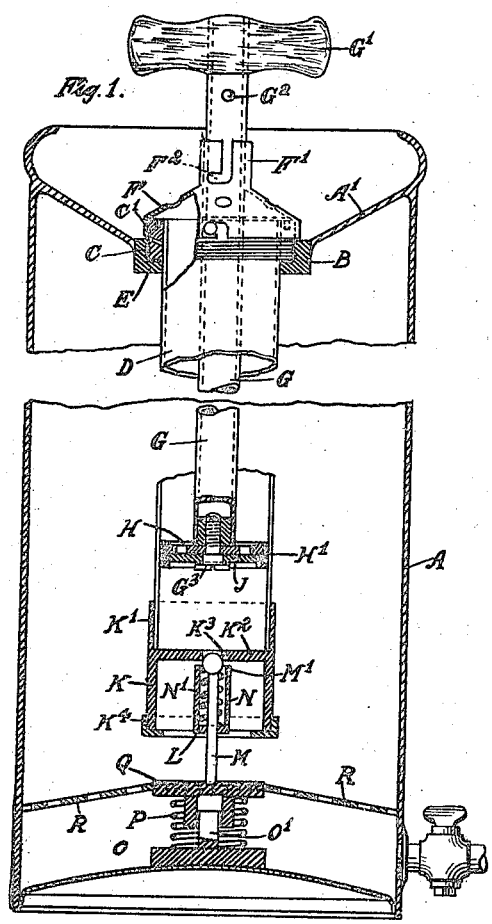
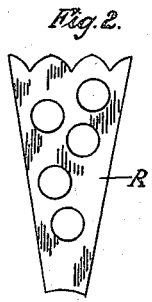
Inventor
Robert Robertson,
by
Att'ys.

Patented July 10, 1923.

1,461,546

UNITED STATES PATENT OFFICE.

ROBERT ROBERTSON, OF LONDON, ENGLAND, ASSIGNOR OF ONE-HALF TO FRANK HALE AUSTIN, OF AUDLEM, CHESTER, ENGLAND.

APPARATUS FOR SPRAYING LIQUIDS BY COMPRESSED AIR.

Application filed June 17, 1920, Serial No. 389,693. Renewed May 31, 1923.

*To all whom it may concern:*

Be it known that I, ROBERT ROBERTSON, a subject of the King of England, residing at 211 Sheringham Avenue, Manor Park, London, E. 12, England, have invented certain new and useful Improvements in or Relating to Apparatus for Spraying Liquids by Compressed Air, of which the following is a specification.

This invention relates to spraying or other apparatus wherefrom liquid is discharged under pneumatic pressure, of the kind comprising a closed container having a delivery nozzle connected therewith and a force-pump which is mounted on the container. Examples of such apparatus are portable sprayers used for horticultural, agricultural, or other purposes and carried like a knapsack on the back of the operator or otherwise, fire-extinguishing apparatus and stoves or lamps wherein liquid fuel is subjected to pneumatic pressure.

The present invention has for its object to provide an improved apparatus of the kind referred to in which the use of a pipe for connecting the inlet of the pump with a receptacle containing liquid to be supplied thereto is entirely obviated. The invention thus obviates the connection and disconnection of pipes to the pump or to the container.

Spraying or other apparatus wherefrom liquid is discharged under pneumatic pressure according to the invention comprising the parts mentioned above is characterized by a receptacle for liquid which is situated on or in the upper part of the container, opens directly into the inlet of the force-pump, and by way of the delivery valve in the latter into the pressure chamber in the container, in order that the container can be supplied either with liquid or with air under pressure as may be necessary by operating the pump without making or unmaking any pipe connection with the pump or with the container and without releasing the pressure in the container.

In portable apparatus according to the invention, the filling receptacle preferably takes the form of a funnel-shaped vessel which is situated centrally in line with a central force-pump, and is connected (for example integrally) to the wall of the container and constitutes the top thereof.

Conveniently, an agitator (for example a spring-controlled bladed member) is provided in the container below the force-pump and is arranged to be operated by the delivery valve of the pump.

Other features of the invention are described hereinafter.

One embodiment of the invention has been illustrated.

Fig. 1 is a vertical sectional elevation showing the portable spraying apparatus according to the invention, and Fig. 2 is a detail view of part of an agitator therein.

Referring first to Fig. 1, a vertical, cylindrical, air-tight container A has its top upper wall $A^1$ shaped to form a funnel which constitutes a receptacle for the liquid to be pumped into the container. The upper edge of the funnel preferably extends upwards beyond the side wall of the container and then inwards, as shown, in order to prevent liquid from being spilt when the funnel is being filled or when the container is slanted. Attached to the margin of the outlet of the funnel is an internally-threaded collar B into which is screwed an externally-threaded ring C firmly secured on the upper end of a barrel D of a force-pump, a ring of packing material E being provided between the lower face of the ring C and the opposed face of the collar B in order to form an air-tight joint. The ring C is provided with a number of inlet-holes $C^1$ which lead from the bottom of the funnel $A^1$ through the wall of the barrel D into the upper end of the latter. Detachably secured on the outside of the ring C by means of bayonet-joints is a perforated conical cap F having a central vertical guide portion $F^1$ in which is cut an L-shaped slot $F^2$. Movable in the guide $F^1$ is a plunger-rod G which carries at its upper end a handle $G^1$ and has a pin $G^2$ which can be entered into the slot $F^2$ to hold the plunger-rod in its extreme lower position.

Secured in the lower end of the plunger-rod G by a screw $G^3$ is a ported plate H which constitutes the plunger and is packed in the barrel by a packing-ring $H^1$. Between the head of the screw $G^3$ and the lower face of the plate H is provided a non-return leather valve J for controlling the flow of fluid through the ports in the plunger.

The lower end of the barrel D carries a circular valve-box K, secured thereto by an upwardly extending tubular portion K¹. The top K² of this valve-box constitutes the bottom of the barrel and has in its centre an outlet K³. The valve-box is open at the bottom but carries a ring K⁴ screwed thereon which holds in position a diametrally disposed guide-bar L having a hole in the centre thereof for guiding a valve-spindle M. This spindle carries on its upper end a spherical valve M¹ arranged to close the outlet K³. A spring N abutting against the bar L and the valve M¹ normally keeps the latter seated on the bottom of the cylinder. This spring is enclosed in a tubular casing N¹ carried by the bar L.

The container A may be provided with a stop-cock for the connection of a delivery pipe having at its end a spraying nozzle, and these outlet devices may be of any suitable form, the same having not been shown.

The above described spraying apparatus operates as follows:—

The receptacle A¹ at the top of the container is first filled with the liquid to be sprayed, whereupon the force-pump is operated and forces all the liquid from the receptacle, in a manner that will be readily understood from the above, into the container A against the pressure of the air therein. On continuing to work the force-pump after the last drops of liquid have left the receptacle through the holes C¹, air is forced into the container until the desired pressure of air acting on the surface of the liquid therein is obtained. Conveniently, a pressure-gauge is provided on the container to indicate the pressure of the air. The spraying apparatus is now charged and ready for use, and it is only necessary to turn the stop-cock into its open position in order to deliver the liquid in the form of spray.

Should the liquid to be sprayed contain matter in suspension, so that it is desirable to stir the liquid in the container, an agitator may be provided at the bottom of the container. As shown in Fig. 1, a disc O having a central vertical guide O¹ is secured centrally on the bottom of the container and carries a spring P, whereon is supported a rocking socket-like member Q which is guided by the guide O¹ and carries a number of perforated blades or vanes R. These blades, whereof one is shown in plan in Fig. 2, extend radially outwards, are serrated at their outer ends and slope slightly downwards. The member Q is pressed by its spring P against the lower pointed end of the valve-spindle M, so that when the force-pump is operated and the valve M¹ is driven up and down, the agitator is moved against the action of the spring P and stirs the liquid in the container.

Having now described my invention, what I claim as new and desire to secure by Letters Patent is:—

1. In a spraying apparatus wherein a pump is mounted in a container and has an outlet valve to establish communication between said pump and the container an agitator in said container operatively connected to said outlet valve to be actuated thereby in one direction when said outlet valve is opened, and means in said container adapted to actuate the agitator in an opposite direction.

2. A spraying apparatus as in claim 1, wherein the agitator is in the bottom of the container, and said means includes a spring between said agitator and the bottom of said container.

3. Apparatus wherefrom liquid is discharged under pneumatic pressure, comprising a closed container having a pressure chamber and a delivery nozzle connected therewith: a manual force-pump mounted on the container and provided with a delivery valve; a filling receptacle for liquid, situated at the upper part of the container, opening directly into the inlet of the force-pump, and, by way of the delivery valve in the latter, into the pressure chamber in the container; and an agitator provided in the container below the force-pump and operatively connected to the delivery valve of said pump.

4. Apparatus wherefrom liquid is discharged under pneumatic pressure, comprising a closed container having a pressure chamber and a delivery nozzle connected therewith; a centrally disposed manual force-pump provided with a delivery valve; a funnel-shaped filling receptacle, situated in line with said force-pump, connected to the wall of the container and constituting the top thereof, said filling receptacle opening directly into the inlet of the force-pump and by way of the delivery valve in the latter, into the pressure chamber in the container; and a spring-controlled bladed member provided in the container below the force-pump and operatively connected to the delivery valve of said pump.

In testimony whereof I affix my signature in the presence of two witnesses.

ROBERT ROBERTSON.

Witnesses:
JOHN AUDLEY WALKER,
EMILY BURNETT.